Aug. 31, 1948.    C. H. BASSETT    2,448,483
METHOD OF MANUFACTURING VALVES
Filed Jan. 26, 1944
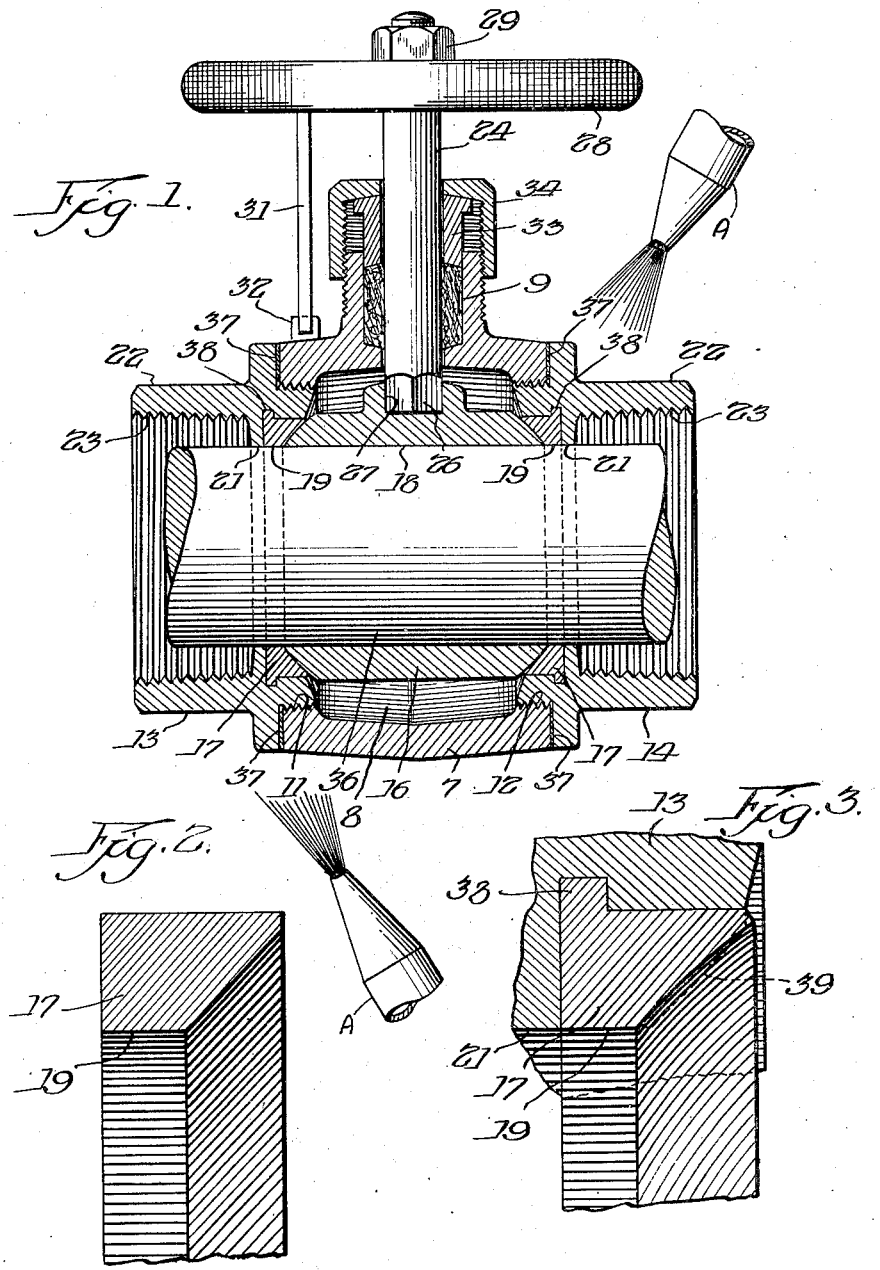
Inventor:
Charles H. Bassett.
By: Joseph O. Lange, Atty.

Patented Aug. 31, 1948

2,448,483

UNITED STATES PATENT OFFICE 2,448,483

METHOD OF MANUFACTURING VALVES

Charles H. Bassett, Chicago, Ill., assignor to Crane Co., Chicago, Ill., a corporation of Illinois Application January 26, 1944, Serial No. 519,970

1 Claim. (Cl. 18—59)

This invention relates to improvements in the method of manufacturing valves and is more particularly concerned with making rotary valves having spheroidal type closure members. It has for an object the provision of conveniently and accurately assembling a valve of this type which is thereafter reliable in operation, inexpensive in its initial construction, and which will not readily get out of order.

It is another object of this invention to provide for the manufacture of a valve having port members for detachable engagement with the valve body and interchangeable to provide for various types of pipe engaging ends or connections. In other words, the same valve body and closure member made by my method may be fitted with port members having threaded ends, or solder ends, or flange ends, etc., to suit the type of piping.

It is a further object of this invention to provide a method of manufacture of a spheroidal type rotary valve in which the port members are non-integral with the body and are preferably formed with seats for engagement with the opposite sides of a spheroidal closure member.

This invention further contemplates manufacturing improvements in applying seating materials and especially to the methods of forming same in spheroidal type rotary valves.

This invention embodies other novel method features, details of providing the construction and arrangement of parts which are hereinafter set forth in the specification and claim and illustrated in the accompanying drawings, forming part thereof, wherein:

Fig. 1 is a vertical sectional view showing a spheroidal type rotary valve employing the method features of this invention in which thermoplastic seat rings are provided in the port members.

Fig. 2 is an enlarged detail sectional view showing the thermoplastic seat ring as it appears prior to forming in assembly between the port members and the closure member.

Fig. 3 is an enlarged detail sectional view showing the formation of the thermoplastic seat ring after being formed in the assembly hereinafter described at greater length.

Referring now to the drawings for a better understanding of applying this invention, a spheroidal type of rotary valve is shown, comprising a body 7 having a passage 8 and stuffing box 9. The ends of the passage 8 are threaded internally at 11 and 12 for threaded engagement with port members 13 and 14, respectively. A spheroidal closure member 16 is disposed within the passage 8 for relative rotational engagement with seat rings 17 provided on the port members and is formed with a port opening 18 which is preferably disposed in axial alignment with port openings 19 and 21 provided in the seat rings and port members, respectively. While the port members have been shown hexagonal at 22 and internally threaded at 23, it is a feature of this invention to provide a manufacturing method employing interchangeable port members which may be formed with screwed ends, soldered ends, brazed ends, flanged ends, etc., to suit the various forms of piping installations.

A stem 24 is formed with a square end 26 for engagement in a square recess 27 formed in the closure member 16, and projects through the stuffing box 9, as indicated, to receive a handwheel 28. The handwheel is secured to the stem by a nut 29 and is provided with a stop finger 31 for engagement with stop lugs 32 formed on the body to limit the rotational movement of the closure member to an arc of 90 degrees. The stuffing box is filled with suitable packing and provided with the usual gland 33 and gland nut 34.

It is well known in this art that valve designs are modified to suit the fluid mediums to be controlled and that it is essential to form the various parts of the valve of the materials best suited to withstand the action of the fluid medium being controlled. It has been discovered that seat rings formed of certain types of thermoplastic and thermosetting plastic materials are particularly suited for use in valves employed for controlling certain fluid mediums as they have a relatively long service life, provide leakproof seating surfaces, and always permit free rotational movement of the closure member. In order to insure a perfect seating surface on the seat rings for engagement of the closure member, the seat rings are preferably formed as illustrated in Fig. 2 for insertion in the port members, and they are held in axial alignment with the closure member by means of a removable shaft 36 which closely engages the port openings 18, 19, and 21. The several parts of the valve are then heated as indicated in Fig. 1 by means of the fuel jet nozzles A to a temperature sufficient to permit forming or molding of the seat rings, and the port members are then threaded onto the body until the shoulders 37 thereon are tightly engaged against the ends of the body. As the port members are threaded into the body, the seat rings engage the closure member and are thus shaped or molded to provide seating surfaces conforming to the seating contour of the closure member and a portion of the material forming the seat rings is forced into the annular retaining grooves 38 formed in the port members as illustrated in Fig. 3, in which the dotted line 39 indicates the seating face prior to forming. After the molding operating is completed the shaft 36 is removed.

It will thus be seen that various types of port members may readily be provided for the same body and closure member, and provided with suitable seat rings or seating surfaces to suit the service requirements.

While this invention has been shown in only a single form it is obvious to those skilled in the art that it is not so limited but is susceptible of various changes and modifications without departing from the spirit thereof or the appended claim.

I claim:

The method of manufacturing a valve comprising forming respectively a casing, a closure member with substantially curved oppositely disposed surfaces and renewable plastic seats therefor, positioning the said seats in the said casing in predetermined relation to the said closure member, holding the said seats by means of the said closure member against shouldered portions within the said casing, inserting a snugly fitting shaft through a central portion of said closure member and said seats, then heating the said seats so as to mold the latter members snugly within the said casing in predetermined form against the shouldered portions of the casing including a peripheral portion of said shaft and against the said oppositely disposed curved surfaces of the closure member and then withdrawing the heat and said shaft.

CHARLES H. BASSETT.

REFERENCES CITED

The following references are of record in the file of this patent:

UNITED STATES PATENTS

| Number | Name | Date |
| --- | --- | --- |
| 117,704 | Warren | Aug. 1, 1871 |
| 934,614 | Huxley | Sept. 21, 1909 |
| 1,043,065 | Cash | Nov. 5, 1912 |
| 1,584,600 | Black | May 11, 1926 |
| 1,888,207 | Bard | Nov. 22, 1932 |
| 1,906,266 | Hoffman | May 2, 1933 |
| 1,973,418 | Sibley | Sept. 11, 1934 |
| 2,032,623 | Lewis | Mar. 3, 1936 |
| 2,312,579 | O'Brien | Mar. 2, 1943 |

FOREIGN PATENTS

| Number | Country | Date |
| --- | --- | --- |
| 254,134 | Italy | July 13, 1927 |
| 676,093 | France | Nov. 18, 1929 |